United States Patent
Rekowski et al.

(10) Patent No.: US 6,582,770 B2
(45) Date of Patent: Jun. 24, 2003

(54) PROCESS FOR COATING

(75) Inventors: Volker Rekowski, Bochum (DE); Oliver Reis, Witten (DE); Christine Kurz, Solingen (DE)

(73) Assignee: E.I. du Pont de Nemours and Company, Wilmington, DE (US)

( * ) Notice: Subject to any disclaimer, the term of this patent is extended or adjusted under 35 U.S.C. 154(b) by 38 days.

(21) Appl. No.: 09/919,576

(22) Filed: Jul. 31, 2001

(65) Prior Publication Data

US 2003/0054118 A1 Mar. 20, 2003

(51) Int. Cl.[7] .............................. B05D 3/02; B05D 7/16
(52) U.S. Cl. ................ 427/385.5; 427/388.1; 427/407.1
(58) Field of Search .................... 427/385.5, 388.1, 427/407.1

(56) References Cited

U.S. PATENT DOCUMENTS

| | | | |
|---|---|---|---|
| 4,528,370 A | * 7/1985 | Lai | 544/173 |
| 5,089,614 A | * 2/1992 | Lai | 544/71 |
| 5,425,970 A | 6/1995 | Lahmann et al. | |
| 5,486,384 A | 1/1996 | Bastian et al. | |
| 6,140,326 A | 10/2000 | Lazzari et al. | |

* cited by examiner

Primary Examiner—Erma Cameron
(74) Attorney, Agent, or Firm—Bart E. Lerman

(57) ABSTRACT

A process for the preparation of a coating layer comprising the steps:

(a) applying a coating layer to a substrate from a coating agent of which the resin solids comprise a binder system curable by free-radical polymerization of olefinic double bonds, and containing 0.1 to 4 wt-%, based on resin solids, of a morpholin-2-one derivative sterically hindered by 3,3,5,5-polysubstitution as a light stabilizer; and (b) thermal curing of the applied coating layer.

16 Claims, No Drawings

PROCESS FOR COATING

FIELD OF THE INVENTION

The invention relates to a process for coating with coating agents that cure by free-radical polymerization of olefinic double bonds.

BACKGROUND OF THE INVENTION

The use of coating agents curable by ultraviolet light (UV) irradiation and based on binders capable of free-radical polymerization is known in automotive and industrial coating; cf. U.S. Pat. No. 5,425,970 and U.S. Pat. No. 5,486,384. Coatings prepared in this way are characterized by outstanding chemical and mar resistance, properties that are particularly desirable for exterior top coat, clear coat or sealing layers.

Coating agents used for the preparation of coating layers for exterior or high-grade interior applications contain light stabilizers based on radical scavengers from the group of sterically hindered piperidines (so-called HALS compounds, HALS=hindered amine light stabilizer), generally in combination with UV absorbers, in order to guarantee a long service life of coating layers produced therefrom. This also applies to coating agents capable of free-radical polymerization under UV irradiation.

Whereas the curing of coating agents capable of free-radical polymerization and containing HALS light stabilizers takes place without problems under UV irradiation, curing by thermally induced free-radical polymerization takes place only incompletely, if at all. Thermal curing is possible if HALS light stabilizers are dispensed with in the coating agent, but leads to a coating with only a limited service life under the action of UV rays, as is the case, in particular, in exterior applications.

If there were not the problem of the limited service life, it would be inherently desirable to use coating agents curing thermally by free-radical polymerization of olefinic double bonds in coating, particularly industrial coating, for example, automotive coating, because of the outstanding properties of the coating layers produced therewith, and the possibility of being able to use these in conventional coating plants equipped for the application of thermally curing coating agents. In short, it would be possible to provide substrates, particularly industrially produced substrates, such as, automotive bodies, with coatings that have the outstanding range of technological properties of weather-resistant coatings chemically cross-linked under UV irradiation by free-radical polymerization of olefinic double bonds without having to use UV curing technology.

3,3,5,5-polysubstituted morpholin-2-one derivatives are known from U.S. Pat. No. 6,140,326 as light stabilizers, inter alia, in coating agents. The coating agents may be coating agents capable of free-radical polymerization under UV irradiation.

Surprisingly, coating layers with a long service life even when exposed to UV rays may be prepared if they are applied from coating agents capable of free-radical polymerization and containing certain sterically hindered morpholin-2-one derivatives as light stabilizers, and are thermally cured.

SUMMARY OF THE INVENTION

The invention provides a process for the preparation of a coating layer comprising the steps:

(a) applying a coating layer to a substrate from a coating agent of which the resin solids comprise a binder system curable by free-radical polymerization of olefinic double bonds and contains from 0.1 to 4 wt-%, based on resin solids, of a morpholin-2-one derivative sterically hindered by 3,3,5,5-polysubstitution as a light stabilizer; and (b) thermal curing of the applied coating layer.

DETAILED DESCRIPTION OF THE EMBODIMENTS

The coating agent applied in step a) of the process according to the invention is also referred to hereinafter as "coating agent" for brevity. The resin solids of the coating agent are composed of i) a binder system chemically cross-linkable by free-radical polymerization of olefinic double bonds (hereinafter also referred to as "binder system capable of free-radical polymerization" for brevity) and optionally ii) components not capable of free-radical polymerization. The resin solids have an olefinic double bond content corresponding to a C=C-equivalent weight of from 300 to 10,000, preferably from 350 to 3,000, more particularly from 400 to 1,500.

The binder system capable of free-radical polymerization is composed of one or more binders capable of free-radical polymerization and optionally one or more reactive thinners capable of free-radical polymerization. The optionally contained components not capable of free-radical polymerization are one or more binders not capable of free-radical polymerization, one or more reactive thinners not capable of free-radical polymerization and/or one or more hardeners not capable of free-radical polymerization.

The binder system capable of free-radical polymerization is a binder system of the kind that is also conventionally used in coating agents chemically cross-linkable under UV irradiation by free-radical polymerization of olefinic double bonds. Such binder systems are known to a person skilled in the art. They contain one or more binders with olefinic double bonds capable of free-radical polymerization. Suitable binders with olefinic double bonds capable of free-radical polymerization include, for example, all the binders known to the skilled person that can be cross-linked by free-radical polymerization of olefinic double bonds. These binders are prepolymers, such as, polymers and oligomers which contain, per molecule, one or more, preferably on average 2 to 20, particularly preferably 3 to 10 olefinic double bonds capable of free-radical polymerization.

The polymerizable double bonds may be present, for example, in the form of (meth)acryloyl, vinyl, allyl, maleinate and/or fumarate groups. The double bonds capable of free-radical polymerization are particularly preferably present in the form of (meth)acryloyl, vinyl, and/or maleinate groups.

Examples of prepolymers or oligomers include (meth)acryloyl-functional (meth)acrylic copolymers, polyurethane (meth)acrylates, polyester (meth)acrylates, unsaturated polyesters, polyether (meth)acrylates, silicone (meth)acrylates and epoxy resin (meth)acrylates having number-average molecular masses from, for example, 500 to 10,000, preferably 500 to 5,000.

The binder system chemically cross-linkable by free-radical polymerization of olefinic double bonds may contain one or more reactive thinners with olefinic double bonds capable of free-radical polymerization. The reactive thinners are low molecular weight compounds with a molecular mass of below 500. The reactive thinners may be mono- di- or polyunsaturated. Examples of monounsaturated reactive thinners include (meth)acrylic acid and the esters thereof, maleic acid and the half esters thereof, vinyl acetate, vinyl ethers, styrene, vinyl toluene. Examples of diunsaturated reactive thinners include di(meth)acrylates, such as, alkylene glycol di(meth)acrylate, polyethylene glycol di(meth)acrylate, butane 1,3-diol di(meth)acrylate, vinyl (meth) acrylate, allyl (meth)acrylate, divinyl benzene, dipropylene glycol di(meth)acrylate, hexane diol di(meth)acrylate. Examples of polyunsaturated reactive thinners include glycerol tri(meth)acrylate, trimethylol propane tri(meth)acrylate, pentaerythritol tetra(meth)acrylate.

Both the binders capable of free-radical polymerization and the reactive thinners capable of free-radical polymerization may contain, in addition to the olefinic double bonds, one or more further, identical or different functional groups. Examples of functional groups include hydroxyl, isocyanate (optionally blocked), N-methylol, N-methylolether, ester, carbamate, epoxy, amino (optionally blocked), acetoacetyl, alkoxysilyl and carboxyl groups.

This will be explained on the basis of the example of binders and reactive thinners capable of free-radical polymerization, in each case having hydroxyl groups as functional groups present in addition to the olefinic double bonds. For example, polyurethane resins with (meth) acryloyl and hydroxyl groups are binders capable of free-radical polymerization having hydroxyl groups as further functional groups. Examples of corresponding reactive thinners capable of free-radical polymerization having hydroxyl groups include compounds, such as, glycerol mono-and di(meth)acrylate, trimethylol propane mono-and di(meth) acrylate or pentaerythritol tri(meth)acrylate.

The functional groups may be used for an additional chemical cross-linking of the coating layer applied from the coating agents as well as the chemical cross-linking by free-radical polymerization of olefinic double bonds. Addition and/or condensation reactions are suitable as additional chemical cross-linking mechanisms. If the binders capable of free-radical polymerization or the reactive thinners capable of free-radical polymerization are furnished with functional groups, such addition and/or condensation reactions may be possible within individual binders capable of free-radical polymerization or between binders capable of free-radical polymerization and/or reactive thinners capable of free-radical polymerization. If one or more of such chemical cross-linking mechanisms is present in addition to the cross-linking mechanism by free-radical polymerization, the term dual-cure coating agent is used.

The addition and/or condensation reactions mentioned in the paragraph above are coating chemistry cross-linking reactions known to the skilled person between functional groups with complementary reactivity such as, the ring-opening addition of an epoxy group to a carboxyl group with the formation of an ester and an hydroxyl group, the addition of an hydroxyl group to an isocyanate group with the formation of a urethane group, the addition of an optionally blocked amino group to an isocyanate group with the formation of a urea group, the reaction of an hydroxyl group with a blocked isocyanate group with the formation of a urethane group and dissociation of the blocking agent, the reaction of an hydroxyl group with an N-methylol group with water dissociation, the reaction of an hydroxyl group with an N-methylolether group with dissociation of the etherification alcohol, the transesterification reaction of an hydroxyl group with an ester group with dissociation of the esterification alcohol, the trans-urethanization reaction of an hydroxyl group with a carbamate group with alcohol dissociation, the reaction of a carbamate group with an N-methylolether group with dissociation of the etherification alcohol, the addition of an amino group to an epoxy group with ring opening and formation of a hydroxyl group and the addition reaction of an amino group or of an acetoacetyl group to a group with olefinic double bonds, e.g., an acryloyl group.

The resin solids of the coating agents may contain, in addition to the binder system chemically cross-linkable by free-radical polymerization of olefinic double bonds, components not capable of free-radical polymerization, namely binders not capable of free-radical polymerization, reactive thinners not capable of free-radical polymerization and/or hardeners not capable of free-radical polymerization.

The binders not capable of free-radical polymerization may be physically drying binders, i.e., binders curing solely by release of solvent and/or water from the applied coating layer, and/or binders having functional groups capable of chemical cross-linking by addition and/or condensation reactions, for example, the addition and/or condensation reactions mentioned in the preceding paragraph.

Examples of binders not capable of free-radical polymerization include corresponding polyurethane, alkyd, polyester and/or (meth)acrylic copolymer resins that may carry, as functional groups, for example, hydroxyl groups corresponding to an hydroxyl value from 50 to 250 mg KOH/g.

Reactive thinners not capable of free-radical polymerization are compounds that may be chemically bound in the coating layer by means of addition and/or condensation reactions, for example, those mentioned above. If, for example, binders having hydroxyl groups and not capable of free-radical polymerization are a component of the resin solids, compounds having at least two hydroxyl groups per molecule and hydroxyl values in the range from 250 to 700 mg KOH/g may be contained as hydroxy-functional reactive thinners. Examples include corresponding polyether polyols, oligoester polyols, polycarbonate polyols and oligourethane polyols.

Hardeners not capable of free-radical polymerization are contained only in dual-cure coating agents. Hardeners not capable of free-radical polymerization are compounds having functional groups, which with regard to chemical cross-linking by addition and/or condensation reactions, assume a complementary reactive functionality towards the functional groups of the other components of the resin solids. If the resin solids contain, for example, hydroxy-functional components, appropriate compounds that are reactive towards hydroxyl groups are suitable as hardeners. Examples of hardeners that cross-link chemically with hydroxyl groups with addition include the polyisocyanates conventionally used in coating chemistry. Examples of hardeners that cross-link chemically with hydroxyl groups with condensation include the blocked polyisocyanates, aminoplastic resins, such as, melamine resins and transesterification cross-linking agents, each of which conventionally used in coating chemistry.

If the resin solids of the coating agent also contain, in addition to the binder system capable of free-radical polymerization, components which are not capable of free-radical polymerization having functional groups capable of addition and/or condensation reactions, chemical cross-linking reactions by addition and/or condensation are possible within individual components not capable of free-radical polymerization, between different components not capable of free-radical polymerization and/or optionally between components of the binder system capable of free-radical polymerization and components not capable of free-radical polymerization. If any of these possible combinations is present, the term dual-cure coating agent is also used.

The resin solids of the coating agents are composed of, for example, from 60 to 100 wt-% of a binder system capable of free-radical polymerization and from 0 to 40 wt-% of components not capable of free-radical polymerization. The resin solids are preferably composed of 100 wt-% of a binder system capable of free-radical polymerization.

Depending on the functionality of the components which make up the resin solids of the coating agents, the coating agents may be multi-component coating agents which, in order to rule out premature chemical cross-linking, are stored separately from one another in several, for example, two components. Only shortly before application are these mixed together to form the coating agent ready for application.

The coating agents may be liquid or powder coating agents. Liquid coating agents may contain-water and/or organic solvents or they may be so-called 100% coating systems that are devoid of solvents and water. In the case of waterborne coating agents, the binders contained may be ionically or nonionically stabilized in order to obtain sufficient water dilutability. Alternatively or in addition, it is possible to achieve water dilutability by means of external emulsifiers.

The organic solvents optionally contained in liquid coating agents are conventional coating solvents. These may originate from the preparation of the binders or they are added separately. Examples of suitable solvents include mono- or polyhydric alcohols, e.g., propanol, butanol, hexanol; glycol ethers or esters, e.g., diethylene glycol dialkyl ether, dipropylene glycol dialkyl ether, in each case with C1 to C6-alkyl, ethoxy propanol, butyl glycol; glycols, e.g., ethylene glycol, propylene glycol and oligomers thereof, N-methylpyrrolidone and ketones, e.g., methyl ethyl ketone, acetone, cyclohexanone; esters such as butyl acetate, isobutyl acetate, amyl acetate, aromatic hydrocarbons, xylene, Solvesso 100 (registered trademark for a mixture of aromatic hydrocarbons with a boiling range from 155° C.–185° C.) and aliphatic hydrocarbons. If, in the case of waterborne coating agents, organic solvents are used in addition, these are preferably water-miscible solvents.

It is important for the invention that the coating agents contain from 0.1 to 4 wt-%, preferably, from 0.5 to 3 wt-%, based on resin solids, of a morpholin-2-one derivative sterically hindered by 3,3,5,5-polysubstitution as light stabilizer. Morpholin-2-one derivatives sterically hindered by 3,3,5,5-polysubstitution are compounds that contain one or more, for example, 1 to 8 of such morpholin-2-one rings sterically hindered by 3,3,5,5-polysubstitution. Reference is made expressly but not exclusively to the morpholin-2-one derivatives sterically hindered by 3,3,5,5-polysubstitution known from U.S. Pat. No. 6,140,326. The coating agents applied in step a) of the process according to the invention contain particularly preferably the 3,3,5,5-polysubstituted morpholin-2-one derivative corresponding to the following formula (Example A 19 of U.S. Pat. No. 6,140,326) as light stabilizer:

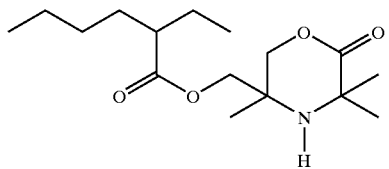

The coating agents preferably contain radical initiators capable of thermal activation and which decompose at different temperatures depending on the initiator type. Examples of such radical initiators include in particular organic peroxides, organic azo compounds or C—C splitting initiators, such as, dialkyl peroxides, peroxocarboxylic acids, peroxodicarbonates, peroxy esters, hydroperoxides, ketone peroxides, azodinitriles or benzpinacol silyl ethers. Preferred use quantities of the radical initiators are from 0.1 to 5 wt-%, based on the resin solids.

The coating agents may be unpigmented coating agents, e.g., transparent clear coats or transparent sealing coating agents or pigmented coating agents. The term sealing coating agents should be understood in this context to mean coating agents that are applied to the external coating layer of a coated surface of a substrate in order to obtain, for example, a particular scratch resistance of a coating.

The coating agents may contain fillers and/or transparent, color- and/or special effect-imparting pigments and/or soluble dyes. Examples of inorganic or organic color-imparting pigments include titanium dioxide, micronized titanium dioxide, iron oxide pigments, carbon black, azo pigments, phthalocyanine pigments, quinacridone or pyrrolopyrrole pigments. Examples of special effect-imparting pigments include metallic pigments, e.g., of aluminum, copper or other metals; interference pigments, such as, metal oxide-coated metallic pigments, e.g., titanium dioxide-coated or mixed oxide-coated aluminum, coated mica, such as, titanium dioxide-coated mica and graphite special-effect pigments. Examples of suitable fillers include silica, aluminum silicate, barium sulfate, calcium carbonate and talc.

In addition to the morpholin-2-one derivatives sterically hindered by 3,3,5,5-polysubstitution and the radical initiators contained in preference, the coating agents may contain further conventional coating additives in conventional amounts known to the skilled person, for example, of up to 5 wt-%, based on the resin solids. Examples of conventional coating additives include leveling agents, rheology-influencing agents, such as, fine-particle silicic acid, layer silicates, rheologically effective urea compounds; thickeners, e.g., based on partially cross-linked carboxy-functional polymers or polyurethanes; defoamers, wetting agents, anti-crater agents, degassing agents, e.g., benzoin, antioxidants, UV absorbers and optionally photoinitiators. HALS compounds of the sterically hindered piperidine type are preferably not present.

Liquid coating agents may be prepared in the conventional manner by dispersion, mixing and/or homogenization of the individual constituents.

Powder coating agents may be prepared, for example, by extrusion of the powder coating ready formulated by dry mixing of all the required components in the form of a pasty melt, cooling the melt, coarse comminution, fine grinding and optionally, followed by sieving to the desired particle fineness. The coating agents in powder form may also be used as an aqueous powder coating slurry.

The coating agents may be used for the preparation of a one-layer coating. However, particularly in the case of liquid coating agents they are used preferably for the preparation of one or more coating layers of a multi-layer coating, for example, for the preparation of a primer, primer surfacer, base coat, clear coat, one-layer top coat and/or sealing layer. They are used preferably for the preparation of an external coating layer of a multi-layer coating, for example, for the preparation of a transparent clear coat or opaque pigmented top coat layer and/or transparent sealing layer.

According to a preferred embodiment, the coating agent is used as a clear coat coating agent for the preparation of an external clear coat layer on a pigmented base coat layer.

According to a further preferred embodiment, the coating agent is used as a transparent sealing coating agent for the preparation of an external sealing layer on a clear coat or on a top coat layer.

According to a further preferred embodiment, the coating agent is used as a top coat coating agent for the preparation of an external pigmented top coat layer on a one-layer or multi-layer precoated substrate, for example, a substrate coated with a primer and/or primer surfacer layer.

In the preparation of multi-layer coatings, at least one coating layer is applied from a coating agent as described above. Coating layers not applied from a coating agent as described above are applied from coating agents known to the skilled person and conventionally used for the preparation of corresponding coating layers of multi-layer coatings. For example, the coating layers to be applied first in the case of the preferred embodiments described above are applied from appropriate coating agents conventionally used for the application of the coating layers concerned and different from the coating agents as described above and optionally cured before the corresponding external coating layer is applied according to the process of the invention.

The coating agents may be applied to the entire surface or to a partial area of the surface of various, optionally already precoated substrates. Suitable substrates include any temperature-sensitive or temperature-non-sensitive substrates, for example, wood, wooden materials, metal, plastic or substrates of mixed construction of metal and plastics parts. Examples include automotive bodies and body parts, facade parts, window frames, exterior and interior furniture, domestic appliance housings.

The application of the coating agents in process step a) may take place according to conventional methods, preferably by spray application in a dry layer thickness of, for example, 10 μm to 80 μm, depending on the type of coating layer to be prepared.

If the coating agents are used in the preparation of multi-layer coatings, their application may also take place in the wet-in-wet process known to the skilled person wherein a coating layer is applied from the coating agent to at least one at least pre-dried but uncured coating layer and is cured together with said layer and/or wherein at least one further coating layer is applied to an optionally, at least pre-dried but uncured coating layer applied from the coating agent, and is cured together with the coating layer applied from the coating agent.

After process step a) has ended, process step b) of thermal curing of the coating layer applied in process step a) may follow immediately afterwards. Generally speaking, however, a short space of time of, for example, from 2 to 30 minutes is interposed between process steps a) and b), the purpose of which, depending on the nature of the applied coating agent is, for example, flashing off and/or leveling (in the case of liquid coating agents) or melting and leveling (in the case of powder coating agents). Such processes taking place during this space of time may be supported by the action of heat. For example, the object temperatures are 20° C. to 120° C. In each case, however, the temperature falls below that which brings about an appreciable chemical cross-linking, particularly by free-radical polymerization. The temperature is, in particular, below the minimum temperature required for thermal curing in process step b).

In process step b) of the process according to the invention, thermal curing of the applied coating layer takes place by the application of heat. In so doing, coating layer temperatures or object temperatures are obtained that are sufficient to initiate and complete free-radical polymerization. The temperature curve during thermal curing may be constant or follow a course in several steps. The latter may be particularly expedient, for example, if a coating agent was used that does not cure exclusively by free-radical polymerization of olefinic double bonds but which is a dual-cure coating agent as described above. The object temperatures during process step b) are, for example, 60° C. to 180° C.

The application of heat during thermal curing according to process step b) may take place with one or a combination of several conventional methods, for example, by infrared and/or near infrared irradiation and/or convection and/or induction heating (in the case of metal substrates). Infrared irradiation and/or convection are preferred.

The curing of the coating layer may be supported by the action of UV radiation before, during and/or after thermal curing according to process step b). It is preferable, however, to dispense with a supporting UV irradiation.

The process according to the invention is suitable for the preparation of coatings on substrates for exterior applications but also on substrates for interior applications, for example, if the latter are exposed to UV-rays of incident sunlight or of UV-ray emitting interior lights or if they are to be protected preventive against UV-rays.

The process according to the invention may be used advantageously in industrial and automotive coating, in the latter case both in automotive OEM finishing and refinishing.

Substrates, in particular industrially produced substrates, such as, automotive bodies may be provided with coatings that have the outstanding range of technological properties of weather-resistant coatings chemically cross-linked under UV radiation by free-radical polymerization of olefinic double bonds. The use of UV curing technology may be dispensed with, for example, curing may take place in baking ovens conventionally used in industrial OEM coating or in heated coating booths conventionally used for paint shops, or by means of conventional infrared radiators.

EXAMPLES

Example 1

(Preparation of a Polyurethane Acrylate Solution)

An 80 wt-% solution of a urethane acrylate in butyl acetate was prepared by initially dissolving 0.125 mole of neopentyl glycol at 65° C. in butyl acetate. 1 Mole of trimeric hexane diisocyanate was then added at 65° C. and the batch was heated to 70° C. After the exothermic reaction had ended, heating was continued at 80° C. until a constant NCO value was obtained. 4-Methoxyphenol (inhibitor) and dibutyltin dilaurate (catalyst) were then added in a quantity of 0.05 wt-% in each case, based on the total batch. 2.75 Moles of butane diol monoacrylate were added at 60° C. in such a way that a temperature of 80° C. was not exceeded.

After an NCO value of <0.1 was obtained, the solids content was then adjusted with butyl acetate.

Preparation of multi-layer coatings with an external clear coat layer:

Example 2

(Comparison)

The resin solution from Example 1 was diluted with butyl acetate to a solids content of 50 wt-%. 97 parts by weight of this solution were mixed with 0.1 parts by weight of a silicone leveling agent capable of free-radical polymerization, 1 part by weight of a light stabilizer (HALS compound of the piperidine type), 0.5 parts by weight of a UV absorber based on benztriazole, 1 part by weight of a photoinitiator from the group of alpha-hydroxyketones and 0.4 parts by weight of a photoinitiator from the group of acylphosphine oxides to form a clear coat coating agent.

The clear coat coating agent thus obtained was applied by spraying in a dry layer thickness of 35 μm to test panels provided with a three-layer pre-coating of cathodic electrodeposition coat primer, primer surfacer and waterborne base coat layer, the latter dried for 10 minutes at 80° C. After a 10 minute flash off at 60° C., the clear coat coating layer was cured by UV irradiation (mercury medium pressure radiator with an output of 100 W/cm, object distance 14 cm, belt speed 1.5 m/min).

Example 3

(According to the Invention)

The resin solution from Example 1 was diluted with butyl acetate to a solids content of 50 wt-%. 96.5 parts by weight of this solution were mixed with 0.1 parts by weight of a silicone leveling agent of Example 2, 0.6 parts by weight of the UV absorber of Example 2, 1.2 parts by weight of the 3,3,5,5-polysubstituted morpholin-2-one derivative according to U.S. Pat. No. 6,140,326, Example A 19 (as light stabilizer) and 1.6 parts by weight of a thermolabile peroxide radical initiator (Trigonox® 21 from Akzo) to form a clear coat coating agent.

The clear coat coating agent thus obtained was applied by spraying in a dry layer thickness of 35 μm to test panels provided with a three-layer pre-coating of cathodic electrodeposition coat primer, primer surfacer and waterborne base coat layer, the latter dried for 10 minutes at 80° C. After 10 minutes flash off at 60° C., the clear coat coating layer was baked for 20 min at 140° C.

Example 4

(Comparison)

Operations were carried out as in Example 3 except that 1.2 parts by weight of the light stabilizer of Example 2 were used instead of 1.2 parts by weight of the light stabilizer used in Example 3.

The clear coat layer was not cured but tacky.

Example 5

(Comparison)

Operations were carried out as in Example 3 except that 97.7 instead of 96.5 parts by weight of the 50 wt-% resin solution and no light stabilizers were used.

Table 1 shows the results of technological tests of the multi-layer coatings prepared in Examples 2, 3 and 5.

TABLE 1

| | Example 2 | Example 3 | Example 5 |
|---|---|---|---|
| Residual gloss [%][1] | 78 | 78 | 78 |
| Pendulum hardness to DIN EN ISO 1522 (oscillations) | 115 | 114 | 114 |
| Short term weathering to SAE J 1960, 5000 hours CAM 180 | OK | OK | Unsatisfactory, considerable decrease in gloss after 700 hours |

The residual gloss in % was measured (ratio of initial gloss of the multi-layer coating to its gloss after scratching, gloss measurement at an angle of illumination of 20° in each case). Scratching was carried out using the laboratory-scale Amtec Kistler car-wash (cf. Th. Klimmasch and Th. Engbert, Development of a uniform laboratory test method for assessing the car-wash scratch resistance of automotive top coats, in DFO Proceedings 32, pages 59 to 66, Technologie-Tage, Proceedings of the seminar on Apr. 29 and 30, 1997 in Cologne, published by Deutsche Forschungsgesellschaft fur Oberflächenbehandlung e.V., Adersstraße 94, 40215 Düsseldorf.)

What is claimed is:

1. A process for coating a substrate with a thermally curable coating layer containing a hindered amine light stabilizer compound, the process comprising the steps of:

(a) applying a coating layer comprising a coating agent to a substrate, wherein the coating agent comprises resin solids, wherein the resin solids comprise at least one binder system chemically cross-linkable by free-radical polymerization of olefinic double bonds, and wherein the coating agent further comprises 0.1 to 4 wt-%, based on resin solids, of a morpholin-2-one derivative sterically hindered by 3,3,5,5-polysubstitution; and (b) curing the coating layer of step (a) thermally.

2. The process according to claim 1, wherein the morpholin-2-one derivative is:

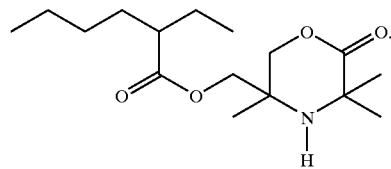

3. The process according to claim 1, wherein the coating agent further comprises radical initiators capable of thermal activation.

4. The process according to claim 1, wherein the coating agent is selected from the group consisting of waterborne coating agents, solvent-based coating agents, solvent-free liquid coating agents, water-free liquid coating agents, and powder coating agents.

5. The process according to claim 1, wherein the coating layer is applied as a one-layer coating.

6. The process according to claim 1, wherein the coating layer is applied as an at least one layer of a multi-layer coating, wherein the at least one layer is selected from the group consisting of primer, primer surfacer, base coat, clear coat, one-layer top coat, and sealing layer.

7. The process according to claim 6, wherein the coating agent is a clear coat coating agent.

8. The process according to claim 7, wherein the coating layer is applied as an external clear coat layer to a pigmented base coat layer.

9. The process according to claim 6, wherein the coating agent is a transparent sealing coating agent.

10. The process according to claim 9, wherein the coating layer is applied as an external sealing layer to a clear coat layer or a top coat layer.

11. The process according to claim 6, wherein the coating agent is a top coat coating agent.

12. The process according to claim 11, wherein the coating layer is applied as an external pigmented top coat layer to a pre-coated substrate.

13. The process according to claim 12, wherein the pre-coated substrate is selected from the group consisting of automotive bodies and body parts.

14. The process according to claim 1, wherein the substrate is selected from the group consisting of automotive bodies and body parts.

15. The process according to claim 1, wherein step (b) is achieved by infrared irradiation or convection heating.

16. A substrate coated with a coating layer prepared according to the process of claim 1.

* * * * *